(12) United States Patent
Zuliani et al.

(10) Patent No.: US 6,356,539 B1
(45) Date of Patent: Mar. 12, 2002

(54) INTERACTIVE SATELLITE BROADCAST SYSTEM

(75) Inventors: Michael Zuliani, Ottawa; Hans-Christian Haugli, Rockcliffe Park, both of (CA)

(73) Assignee: Vistar Telecommunications Inc., Ottawa (CA)

( * ) Notice: Subject to any disclaimer, the term of this patent is extended or adjusted under 35 U.S.C. 154(b) by 0 days.

(21) Appl. No.: 09/142,918

(22) PCT Filed: Mar. 14, 1997

(86) PCT No.: PCT/CA97/00178

§ 371 Date: Dec. 10, 1998

§ 102(e) Date: Dec. 10, 1998

(87) PCT Pub. No.: WO97/35432

PCT Pub. Date: Sep. 25, 1997

Related U.S. Application Data

(60) Provisional application No. 60/013,662, filed on Mar. 19, 1996.

(51) Int. Cl.[7] .......................... H04B 7/216; H04Q 7/00; H04H 1/00
(52) U.S. Cl. .................. 370/320; 370/329; 455/3.02
(58) Field of Search ................ 370/320, 329, 370/334, 338, 339, 341, 342; 455/3.02, 12.1, 15, 19, 82, 507, 509, 517; 375/130, 133

(56) References Cited

U.S. PATENT DOCUMENTS

| | | | | |
|---|---|---|---|---|
| 4,962,507 A | * | 10/1990 | Renshaw | 375/1 |
| 5,053,782 A | * | 10/1991 | Levinberg et al. | 342/352 |
| 5,638,361 A | * | 6/1997 | Ohlson et al. | 370/342 |
| 5,835,057 A | * | 11/1998 | Van Heyningen | 342/359 |
| 5,864,747 A | * | 1/1999 | Clark et al. | 455/3.2 |
| 5,898,681 A | * | 4/1999 | Dutta | 370/229 |
| 5,912,883 A | * | 6/1999 | Hershberg | 370/319 |
| 5,991,279 A | * | 11/1999 | Haugli et al. | 370/311 |

* cited by examiner

Primary Examiner—Alpus H. Hsu
Assistant Examiner—Duc Ho
(74) Attorney, Agent, or Firm—Marks & Clerk

(57) ABSTRACT

In a method of providing an interactive broadcast service, broadcast signals are transmitted via a wideband satellite link to end users. Return signals are received from the users transmitted over a narrowband satellite link separate from the first link. The return signals allow users of the service to send commands back to the base station to request specific services.

3 Claims, 4 Drawing Sheets

INTERACTIVE SATELLITE BROADCAST SYSTEM

CROSS REFERENCE TO RELATED APPLICATIONS

This application claims the benefit under 35 USC 119(e) of U.S. provisional application No. 60/013,662 filed Mar. 19, 1996.

BACKGROUND OF THE INVENTION

1. Field of the Invention

This invention relates generally to a satellite communications system providing interactive services to end users.

2. Description of Related Art

Direct Broadcast Satellite DBS systems, where service providers broadcast direct to small receiving dishes in the home, are well known. Initially, these were one-way services allowing purely passive reception. More recently, telephone operating companies have started providing a return line through a terrestrial line to accommodate a user return capability for services such as pay per view TV, home shopping, home banking and similar other services; HUGHES DirectTV presently uses a POTS line as a return to carry information relating to the billing of services provided. This solution requires the use of the switched telephone network and is inefficient, especially when it is used to carry small amounts of data such as ordering information and the like.

Some DBS services offer access to the Internet with the downstream data being provided via satellite on a wideband channel and the return path being via a narrow band terrestrial link, usually a conventional POTS telephone line. This arrangement requires a switched telephone circuit and ties up the public switched network even though relatively small amounts of data are transmitted on the return link on an occasional basis.

BRIEF SUMMARY OF THE INVENTION

An object of the invention is to provide an improved interactive direct broadcast system.

According to one aspect of the present invention there is provided an interactive direct broadcast station comprising means for transmitting broadcast signals via satellite to an end user over a wideband satellite link, means for receiving return signals from end users over a separate narrow band satellite return link providing a return path, and means for interpreting said return signals to respond to requests from the end user.

The broadcast signals can be conventional broadcast video signals or multimedia signals from the comprising text, graphics, sound and video. The Internet is an example of a source of multimedia signals, which can be downloaded over the wideband link.

A wideband link is of the type suitable for broadcast purposes, such as the Ku-band allocated for satellite service. A narrowband link is of the type more usually associated with mobile communications, such as the L-band.

The forward broadcast signals are preferably carried in the Ku band, with the return command signals being carried in the L-band, which is typically used for mobile communications. The invention thus combines two, different one-way satellite transmissions using two different satellites. In a preferred embodiment, this invention uses an L-band satellite proximate to the Ku band broadcast satellite to provide a low cost return path from an individual subscriber. It is estimated that up to a million transactions per hour on the L-band satellite can be provided with each 300 kHz circuit. Currently set top boxes on the user premises have a one way path from a satellite dish that allows a receive only function.

This invention thus provides an inexpensive narrow band transmitter to the system which provides a low cost return. It is estimated that the cost of a single transaction is a small fraction of the cost of a transaction using POTS.

The associated cost using an L-band satellite for low rate data transmission is less than the cost of using Ku-band satellites for high speed return data transmission; L-band transmitters can be at low cost incorporating a low signal level with an antenna having low gain; L-band systems are coordinated to cope with low level wide beam broadcast signals, thus adjacent satellite interference problems can be overcome.

In a preferred embodiment of this invention CDMA (Code division Multiple Access) is used to ensure a lowest possible RF transmit level for a quantity of information that is transmitted on the return link, thereby providing return capacity at low cost. The invention provides a new combination of the receiver and transmitter with CDMA L-band operating simultaneously in conjunction with a broadcast signal in the Ku band. A specific and preferred embodiment of this invention relates to its applicability to existing home satellite dishes that can be adapted at a low cost to conform with the teachings of this invention.

The system includes a narrow beam accurately directed Ku-band antenna (currently present in DBS systems), and in accordance with this invention a second low gain wide-beam L-band antenna. The L-band antenna may be independent of the narrow beam antenna, or it may be incorporated with the DBS antenna, using the dish or a reflector. The latter embodiment produces a very wide beam at L-band because the reflector is small in terms of L-band wavelengths.

The L-band antenna can be mounted in conjunction with the narrow beam antenna, preferably on the same dish, for example, near its periphery because the L-band antenna does not make use of the focussing characteristics of the dish and does not have to be pointed accurately.

Alternatively, the L-band antenna may be independent of the Ku-band antenna. It may be mounted on the periphery of the Ku-band dish or alternatively, remote from it in the form of a microstrip patch or short helix of several turns providing suitable, relatively low gain for this application.

This invention combines the advantages of satellite mobile communications in the L-band with the advantages of the broadcasting capabilities of the Ku band. The system provides a high data rate broadcast signal out (on the Ku band) and a low data rate return signal (on the L-Band). Furthermore, this can be achieved with existing satellites.

Another novel and inventive aspect of this invention lies in the arrangement of components disposed between a set top-box and the antenna units. Essentially these components comprise a CDMA module providing modulation of the L-band return signal. This module further includes a Tx unit for the L-band.

According to another aspect of the invention there is provided a home direct broadcast receiving system, comprising a receiver for receiving wideband broadcast signals from a hub station via satellite on a wideband link, means for generating return signals for making specific requests to said hub station, and a transmitter for transmitting said return signals via satellite back to said base station over a separate narrowband link.

According to a still further aspect of the invention there is provided a method of providing an interactive broadcast service comprising the steps of transmitting broadcast signals via a wideband satellite link to end users, receiving return signals from said users transmitted over a separate narrowband satellite link, and responding to said return signals to provide services requested by said users.

The invention thus provides a communications system that comprises two different satellites each configured to operate to form a single communications system wherein each satellite is are in one-way communications but together, provide two way communications. More specifically, an aspect of the invention relates to terminal equipment on the user premises, comprising a small low cost transmitter in a return link in the system.

BRIEF DESCRIPTION OF THE DRAWINGS

The invention will now be described in more detail, by way of example, only with reference to the accompanying drawings, in which.

DETAILED DESCRIPTION OF THE PREFERRED EMBODIMENTS

Figure 1:
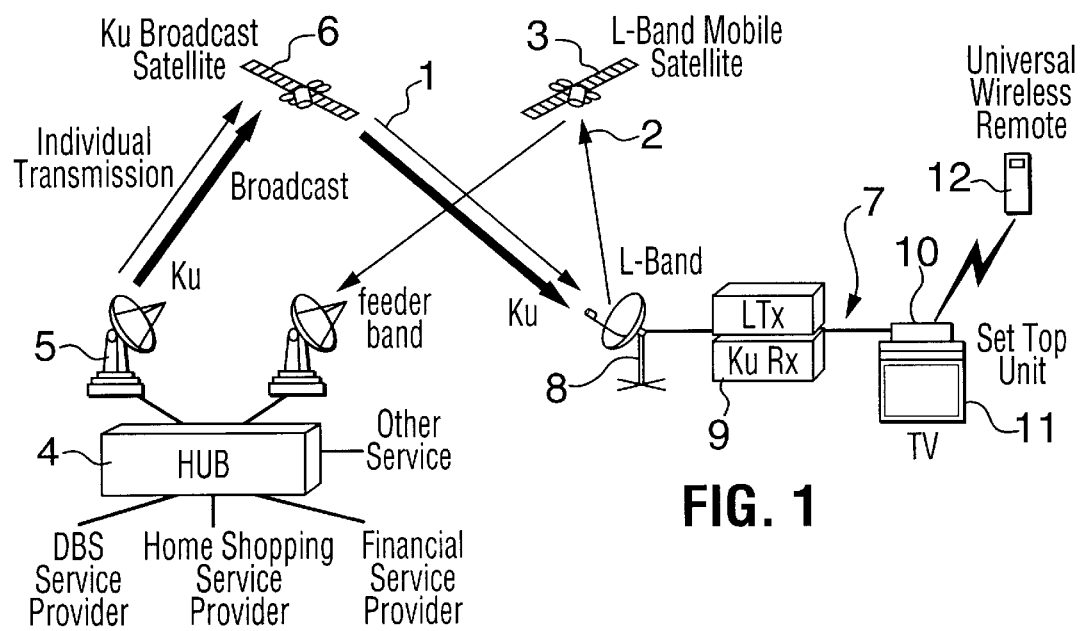
FIG. 1 is general diagram of an interactive satellite broadcast system in accordance with the invention.

The system in accordance with this invention is illustrated in FIG. 1. The system makes combined use of two satellite systems both operating in a one-way mode. The forward link 1 is a direct broadcasting/direct-to-home satellite system, inherently a one-way system, broadcasting to several million users. The bulk of broadcast services comprise entertainment video services, which include pay-per view and impulse pay-per-view television. Both of the latter may make use of a very low capacity return link 2 to order particular services or to convey the information that particular services were used. A wide variety of infotainment services which also require a low capacity return link may also be provided. Examples are home shopping, financial services, video auctions, horse race betting, video casinos, travel arrangements, opinion polling, game shows etc.

The return link 2 is provided through the one-way use of an L-band, geostationary orbit, mobile satellite system 3. Since only a very low capacity is required in the return link, the transmitter uses Code Division Multiple access technology, which results in a low cost and is ideally suited to this application because most transactions on the return path involve bursts of relatively small amounts of data. From 100 to 200 bits are sufficient for most transactions, and transmission rate is nominally in the range of 1200 to 4800 bps. The L-band link is designed to permit typically 400 messages per second per circuit.

In FIG. 1, the hub 4 has feeds from various services, such as from a DBS service provider, home shopping service provider, and financial service provider and broadcasts these from conventional satellite broadcast transmitter 5 via a channel on the Ku band satellite 6 to home users, such as 7. Each home user includes a Ku band receiving antenna 8, a combined L-band TX/Ku-band RX unit 9, and a set-top unit 10 connected to a television 11. The set-top unit 10 may be controlled by a wireless remote control unit 12 in a conventional manner.

In operation, a typical user 7 can select a broadcast channel using his remote unit 12 in a conventional manner. In addition, the user can request specific services, for example, pay-per-view movies by entering appropriate codes into the remote unit 11. These are then transmitted on the L-band link back to the hub 4 using CDMA techniques. The hub 4 can then respond by, for example, enabling the users address on the broadcast channel so as to grant access to a requested movie. The return link can also be used to transmit ordering information for home shopping services, or instructions to the financial services provider to carry out certain transactions. The primary characteristic of the data on the return link 2 is that it very low bandwidth compared to the broadcast signals since it in essence consists of commands from the user related to the broadcast signals.

Congestion control techniques can be implemented to provide the availability required by the individual application, typically 99.9%, but higher if required. The cost of the L-band transmit unit should be US$100 or less.

Figure 2:
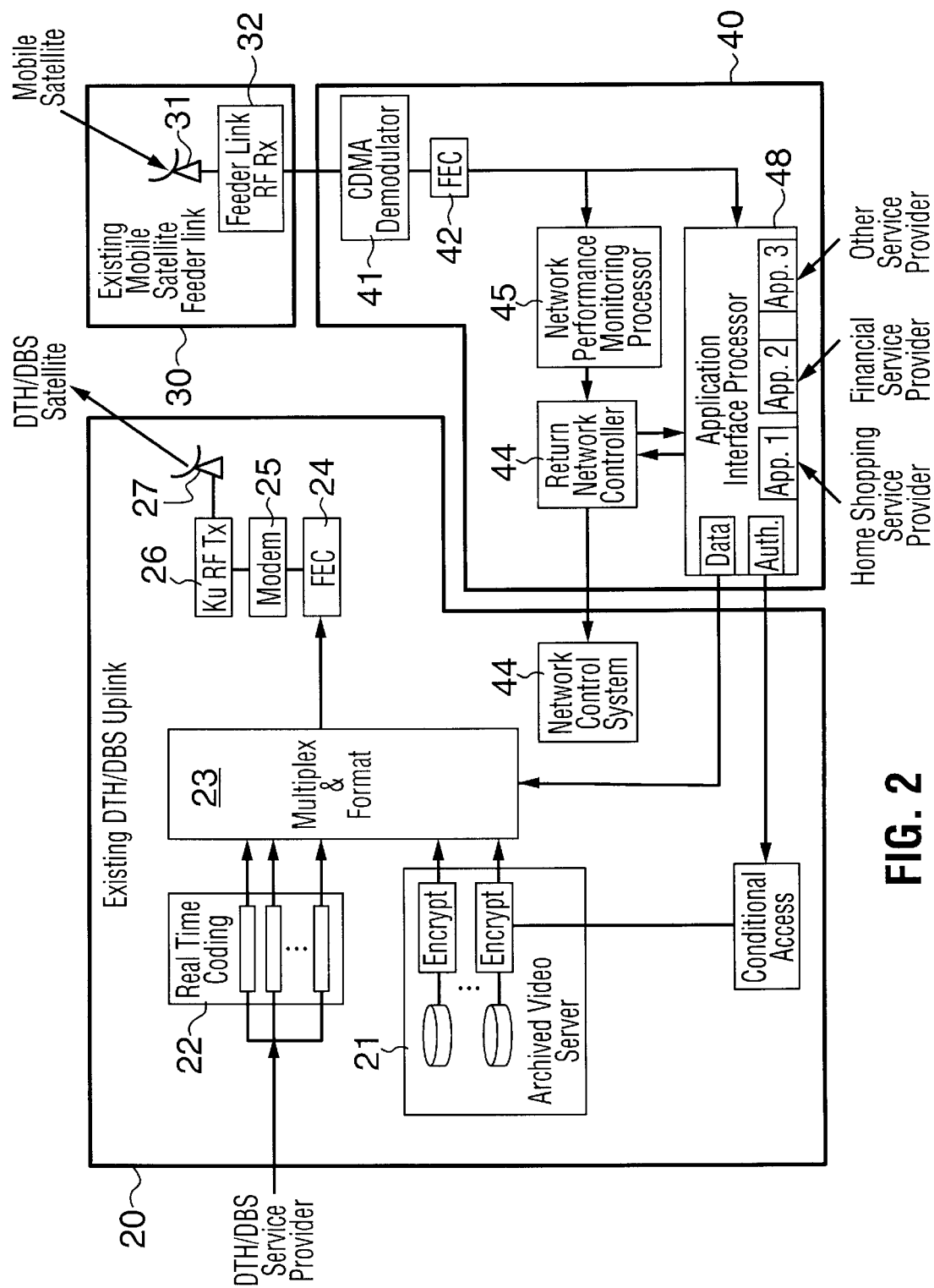
FIG. 2 is a block diagram of a hub station in accordance with the invention.

Referring now to FIG. 2, the primary elements embodied in the uplink and downlink hub earth stations are shown, including the principal interfaces.

Existing DTH/DBS uplink 20 and mobile satellite feederlink earth stations 30 are used, with the addition of a number of elements to facilitate the low cost satellite return link system.

The uplink unit 20 comprises a archived video server 21 for storing movies and the like, and a real-time coder 22 receiving signals from a DTH/DBS service provider and coding them so as to allow reception only by authorized users. The output of the coder 21 along with the output of the video server 21 is fed to multiplex and formatting unit 23, which formats the signals for broadcast over the Ku-band satellite link 1 from antenna 27 after passing through forward error correcting unit 24, modem 25, and Ku-band Tx unit 26.

The return signals in the L-band are received by the mobile satellite feeder link receiving antenna 31 and passed through feeder unit 32 to CDMA demodulator 41 in interface unit 40. After CDMA demodulation, the signals are passed through forward error correction unit 42 to recover errors and from there to application interface processor 43.

The application interface processor 43 receives these signals and either passes them through to the return network controller 44, which interfaces with the network control system 45 in the uplink unit 20 or else passes them to the appropriate third party providers, such as financial services providers and the like.

The signals from the FEC unit 42 are also fed to the network Performance Monitoring Processor 45, which feeds the Return Network Controller 44. This controls the return terminal transmission using a suitable congestion control strategy to ensure that signal loss does not exceed the availability specification.

Figure 3:
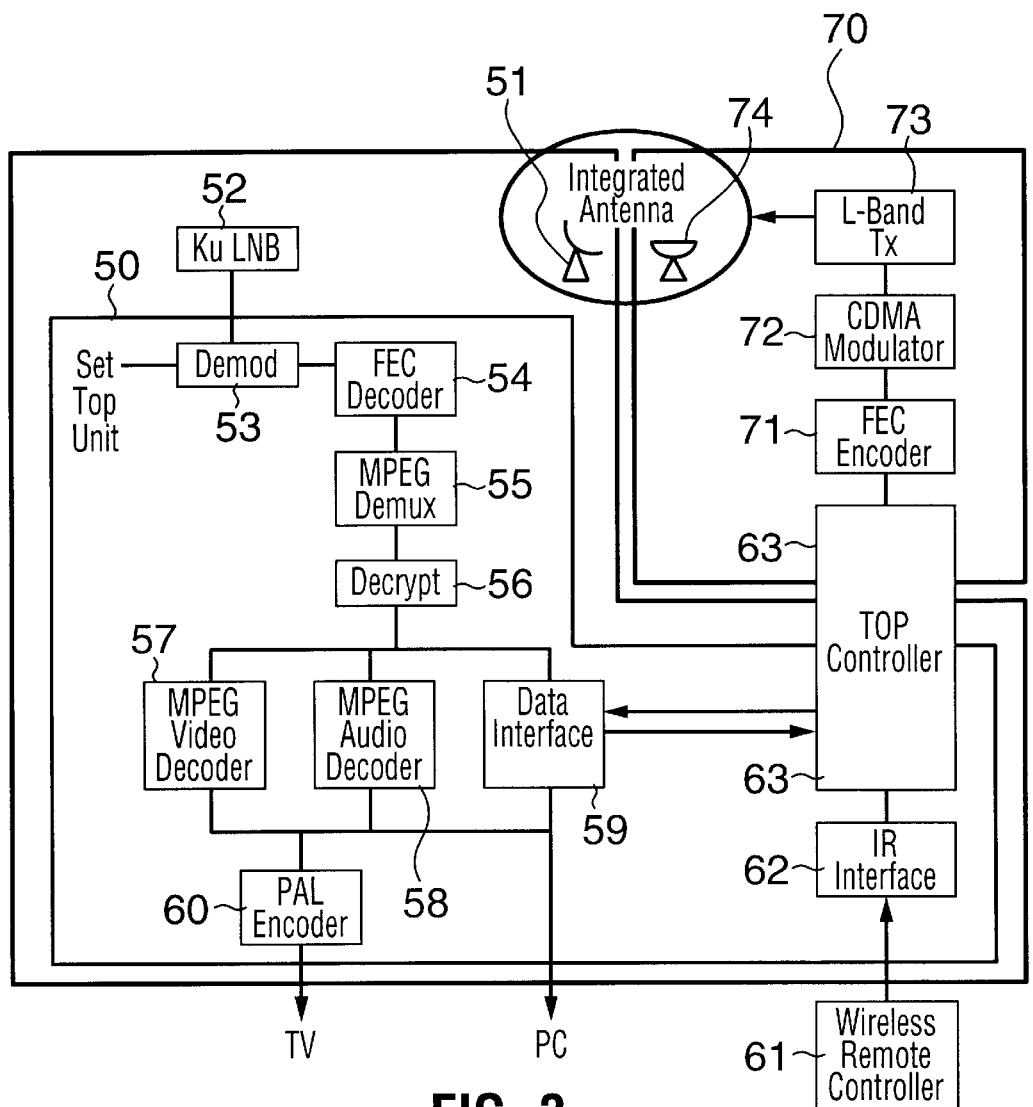
FIG. 3 is a block diagram of a DTH/DBS terminal enhanced with a narrowband return link.

The DTH/DBS 50 receiver is shown in FIG. 3. The set-top unit 50 deals with both applications related data being transmitted and network control data generated by the Return Network Controller 44 at the hub station. Typical set-top units are the Star Trak 1000, DSS model 4430, and Power Vu Model D9223 digital satellite receivers manufactured respectively by Tee-Comm, RCA, and Scientific Atlanta.

Ku-band antenna 51 feeds signals to low noise receiver 52, which forwards them in turn to demodulator 53, FEC decoder 54, MPEG demultiplexor 55, and decrypter 56, which passes only signals authorized for the user. From the decrypter 56, the signals are passed to the MPEG video decoder 57, the MPEG audio decoder 58, and data interface unit 59. Units 57 to 59 are connect to PAL or NTSC encoder 60, for connection to a television, and a PC to provide, for example, wideband downstream access to the Internet.

The set top unit 50 is controlled by wireless remote 61 communicating with a wireless interface unit 62 connected to set top controller 63. The block 50 as described so far is conventional. However, the set-top controller 63 is modified to incorporate software to deal with applications using the return link capability described herein. Specifically the additional software formats and generates the return link signal passed to forward error correcting encoder 71.

In accordance with this embodiment of the invention, the set top controller 63 is also connected to a forward error correcting encoder 71, a CDMA modulator 72, and an L-band transmit unit 73. This in turn feeds an L-band antenna 74, which is in close proximity to the Ku-band antenna 51, for onward transmission to the separate L-band satellite, which is generally close to the Ku-band antenna Downstream signals are received in a conventional manner. Applications data is encoded and modulated for transmission upstream by the low power L-band transmitter 73 via the mobile satellite used. Actual transmission timing is under control of the congestion control strategy being exercised for the particular application being served. The L-band transmit antenna is preferably physically integrated with the DTH/DBS receive antenna, but may also be an independent stand-alone antenna, depending on the proximity of the DTH/DBS and mobile satellites in use.

Figure 4:
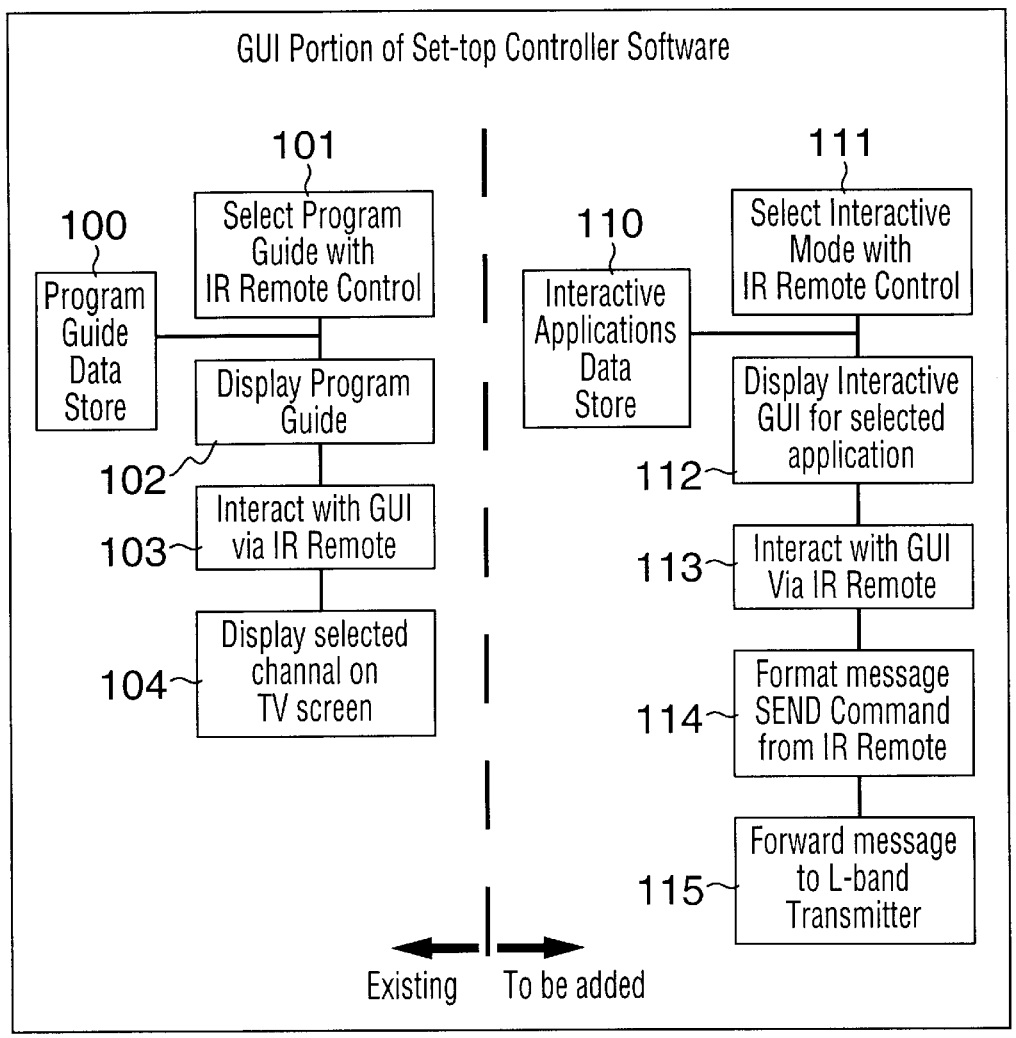
FIG. 4 is a block diagram showing the necessary additions to the set-top controller software.

FIG. 4 shows the set-top controller in more detail. This consists of a program data store 100, a select program guide unit 101 (with IR remote control), a display program guide GUI (Graphical User Interface) 102, A unit 103 for permitting interaction between the GUI and the IR remote unit, and a unit 104 for displaying the selected channel on the TV screen. These components are found in a conventional set-top unit. In addition, the modified controller employed in the invention includes an interactive data store 110, a unit 111 for permitting the user to select the interactive mode with the IR remote control, a unit 112 for displaying a GUI for the selected application, a unit 113 for permitting interaction between the GUI 112 and the IR remote 61, and a message formatter 144. This formats messages on the send command from the IR remote unit 61, which are then forwarded to the L-band transmitter by the unit 115.

A typical example of the invention might be a home shopping service, which would be used by an enrolled and registered user who has already supplied mailing and courier delivery addresses, credit card numbers, etc. to the home shopping network. To make use of the interactive return capability, the home shopping broadcast signal will include an order screen that is displayed to the user's TV on command from the remote control. Continuing to use the remote control, the user can navigate through the order screen, filling in ordering information pertinent to the item to be purchases. Such as quantity, color, size, etc. When complete, the user can send information to the home shopping service office as a "purchasing information request" using a "send message" button on the remote control. The home shopping service will immediately send an addressed message back to the user containing price, availability, delivery information, etc. as well as "yes, I wish to purchase", "payment method", "order change", or "cancellation", etc. selection boxes on the screen. After selection of the appropriate boxes, the user can again use the "send message" button on the remote control. The home shopping service would then send a confirmation message to the user.

The user terminal addressing capability is already part of the DTH/DBS systems in place. The capability to decode and display screens related to interactive applications requires modification of the set top controller software in the set top unit 50. A modified wireless remote control 61 is also required with additional function buttons related to the interactive mode, such as "display interactive screen" and "send message". Remote control functions such as menu scrolling and menu item selection are normally available on typical wireless remote controllers supplied with DBS set top boxes, but the set-top controller 63 also requires modification to deal with the interactive-related TV display screens, message formatting, and send command functions. Formatted messages pertinent to the specific application are then processed by the L-band transmitter 70 and sent via the L-band satellite to the home shopping service office (in this case). Set top controller software additions and remote control unit modifications to standard units used with available DTH/DBS services accommodate a wide variety of applications of interest to users.

The present invention provides an optimal solution to the problem of providing a return path in typical consumer applications, where the amount of data transmitted on the return path is small relative to the amount of data to be received on the forward path.

What is claimed is:

1. An interactive direct broadcast satellite system, comprising:
    (a) a direct broadcast station comprising:
        (i) a first transmitter for transmitting direct broadcast material over a wideband channel in the Ku band via a direct broadcast satellite to multiple users; and
        (ii) a hub connected to content providers for providing specific broadcast signal to said transmitter in response to requests from said users; and
    (b) a plurality of receiving stations each comprising:
        (i) a receiver for receiving and decoding said broadcast signal;
        (ii) a control unit for enabling a user at said receiving station to enter requests for specific signal;
        (iii) a controller for generating bursts of data representing said user requests;
        (iv) an encoder for encoding said bursts of data;
        (v) a CDMA modulator for modulating said encoded bursts of data to provide an encoded CDMA modulated return signal; and
        (vi) a transmitter for transmitting said modulated encoded signal to said hub via a narrow band satellite channel in the L band.

2. An interactive direct broadcast satellite system as defined in claim 1, further comprising a set top unit for receiving the decoded Ku-band signal received from said Ku broadcast satellite and for providing said retain signal.

3. An interactive direct broadcast satellite system as defined in claim 2, further comprising a Ku-band satellite dish and an L-band antenna mounted on said satellite dish for transmitting said return signal.

\* \* \* \* \*